(12) United States Patent
Yin

(10) Patent No.: US 9,804,984 B2
(45) Date of Patent: Oct. 31, 2017

(54) DEVICE AND METHOD FOR DETECTING TYPES OF UNIVERSAL SERIAL BUS CABLE

(71) Applicant: REALTEK SEMICONDUCTOR CORP., Hsinchu (TW)

(72) Inventor: Kai-Yuan Yin, Jiangsu (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/073,036

(22) Filed: Mar. 17, 2016

(65) Prior Publication Data

US 2016/0274163 A1    Sep. 22, 2016

(30) Foreign Application Priority Data

Mar. 18, 2015   (CN) .......................... 2015 1 0118969

(51) Int. Cl.
   *G06F 13/38*   (2006.01)
   *G06F 13/42*   (2006.01)
   *G06F 1/22*    (2006.01)
   *G06F 1/26*    (2006.01)

(52) U.S. Cl.
   CPC .............. *G06F 13/385* (2013.01); *G06F 1/22* (2013.01); *G06F 1/266* (2013.01); *G06F 13/4282* (2013.01); *G06F 13/4295* (2013.01)

(58) Field of Classification Search
   CPC ............... G06F 13/385; G06F 13/4068; G06F 13/4027; G01R 27/02; G01R 31/026; G01R 27/04
   USPC .......... 324/66, 439, 500, 762.01, 539, 543, 324/691–694, 71.6, 508, 548, 661
   See application file for complete search history.

(56) References Cited

U.S. PATENT DOCUMENTS

2014/0304555 A1* 10/2014 Liu ...................... G06F 11/0745
                                                      714/43
2017/0024350 A1*  1/2017 Burgers .............. G06F 13/4072

* cited by examiner

*Primary Examiner* — Melissa Koval
*Assistant Examiner* — Trung Nguyen
(74) *Attorney, Agent, or Firm* — Muncy, Geissler, Olds & Lowe, P.C.

(57) ABSTRACT

A detection device for detecting types of a universal serial bus cable includes a detection circuit and a control unit. The detection circuit includes a signal source, a receiving end, a first resistor, a second resistor, a variable resistor, a first capacitor, a second capacitor, first through fourth switches, a $V_{BUS}$ end, an ID end, and a ground end. The signal source provides a detection signal. The control unit is electrically connected to the detection circuit, and is configured to control the first through the fourth switches according to a plurality of on-off states, to receive the detection signal and a $V_{BUS}$ signal from the receiving end in the plurality of on-off states, to generate a plurality of detection results, and to determine the type of the USB cable according to the plurality of detection results.

12 Claims, 5 Drawing Sheets

DEVICE AND METHOD FOR DETECTING TYPES OF UNIVERSAL SERIAL BUS CABLE

CROSS-REFERENCE TO RELATED APPLICATION

This application claims priority from Chinese Patent Application No. 201510118969.3, filed on Mar. 18, 2015, in the State Intellectual Property Office of China, the content of which are hereby incorporated by reference in their entirety for all purposes.

BACKGROUND OF THE INVENTION

1. Field of the Invention

The present invention relates to a device and method for detecting types of universal serial bus (USB) cable, and in particular to a device and method for detecting types of USB cable by disposing a variable resistor in the detection circuit and controlling the variable resistor corresponding to a plurality of on-off states to reduce the error rate of the USB cable.

2. Description of the Related Art

In order to allow the AC/DC power supply to be used in a variety of terminal equipment, and reduce the number of cable use to achieve the effect of energy saving and carbon reduction, a new USB power delivery specification (USB PD Spec.) is adopted, in which the USB specification may supply power of maximum 100 watt, such that not only the convenience of mobile application of each device can be strengthened, but also the charging time of the device can be effectively reduced to improve the efficiency by a larger current.

In USB PD Spec., a source end (provider) and a receiving end (consumer) are defined. Both sides must decide the actual transmitted voltage value and current value through data communication. The process thereof includes determining whether the inserted cable connector plug supports USB PD specification and confirming the transmitted electrical voltage value and current value through the data communication by both the source end and the receiving end.

Taking USB PD Standard-A connector plug as an example, in order to identify whether the USB PD specification is conformed, "PD Detect" pins are designed to be added in the USB PD Standard-A receptacle. By detecting the contacts between the pins of the receptacle and the USB plugs, the connected cable is determined if it supports the USB PD specifications or not. For detecting USB PD Standard-B plug. "ID" pin is added in the USB PD Standard-B receptacle, such that the connected cable can be determined if it supports the USB PD specifications. In addition, according to the location of the built-in capacitors, the current capabilities of the connected plug is determined, such as the current of 3 A or 5 A. In order to identify the different types of connected plugs, different resistors and capacitors are connected in series between the $V_{BUS}$ line and the ID line and between the ID line and the GND line.

Furthermore, when the capabilities the current of the connected cable is determined, the detection steps are required for the connected plug. The detection circuits and methods are designed by USB-IF to determine the capabilities of the current of USB cable. In the process of detection, a signal is provided by the signal source. By detecting the signal at the receiving end under different states of the switches of the detection circuit, the types of connected plug may be determined based on the returned signal.

However, in the process of determination described above, the signal is substantially attenuated by the parasitic capacitor on the ID line. The generation of parasitic capacitors on the ID line are caused by the following reasons: the parasitic capacitors on the ID soldering pad, generated by the wires between the ID soldering pad and the receptacle on the printed circuit board (PCB), caused by the guiding holes on the PCB, introduced by the connected plug, and caused by the general purpose input/output (GPIO) interface usually connected to the ID end, etc. The errors are generated by all the parasitic capacitors mentioned above during the detection steps. Thus, the determination of the types of connected plug are tend to fail.

SUMMARY OF THE INVENTION

In order to solve the problems mentioned above, an aspect of the present invention provides a device for detecting types of universal serial bus (USB) cable which is applicable to determine types of a USB cable. The USB cable at least includes a $V_{BUS}$ line and a ground line. An electronic device is connected to another end of the USB cable opposing to the device for detecting types of USB cable and provides a $V_{BUS}$ signal to the $V_{BUS}$ line. The device for detecting types of USB cable includes a detection circuit and a control unit. The detection circuit includes a signal source, a receiving end, a first resistor, a second resistor, a variable resistor, a first capacitor, a second capacitor, a first switch, a second switch, a third switch, a fourth switch, a $V_{BUS}$ end, an ID end and a ground end. The signal source provides a detection signal. The first resistor has a first end and a second end. The first end is connected to the signal source. The variable resistor has a first end and a second end. The first end of the variable resistor is connected to the second end of the first resistors. The second resistor has a first end and a second end. The first end of the second resistor is connected to the second end of the variable resistor. The second end of the second resistor is connected to the ground end corresponding to the ground line. The first capacitor has a first end and a second end. The first end of the first capacitor is connected to a first node between the variable resistor and the second resistor. The second end of the first capacitor is connected to the ID end. The second capacitor has a first end and a second end. The first end of the second capacitor is connected to a second node between the first resistor and the second resistor. The second end of the second capacitor is connected to the $V_{BUS}$ end corresponding to the $V_{BUS}$ line. The first switch is connected between the second node and the receiving end. One end of the second switch is connected between the receiving end and the second end of the first switch. Another end is connected to the first node. The third switch is connected in series between the first node and the first capacitor. The fourth switch is connected in series between the first node and the first end of the second resistor. The control unit is electrically connected to the detection circuit, and is configured to control the first switch, the second switch, the third switch and the fourth switch according to a plurality of on-off states, to control the variable resistor and the signal source to transmit the detection signal respectively corresponding to the plurality of on-off states, to receive the detection signal and the $V_{BUS}$ signal respectively from the receiving end during the plurality of on-off states, to generate a plurality of detection results and to determine types of the USB cable based on the plurality of detection results.

Preferably, the plurality of on-off states may include a first on-off state, a second on-off state and a third on-off state, the second switch is switched on and the first, the third and the fourth switch are switched off in the first on-off state. In the second on-off state, the second and the third switch are switched on and the first and the fourth switch are switched off. In the third on-off state, the second, the third and the fourth switch are switched on and the first switch is switched off. Also, the control unit is configured to receive the $V_{BUS}$ signal and the detection signal respectively from the receiving end in the first, the second and the third on-off states in order to generate the plurality of detection results respectively.

Preferably, the control unit may be configured to control the variable resistor to change to a first resistance value in the first and the third on-off states.

Preferably, the first resistance value may be about 1 kΩ.

Preferably, the control unit may be configured to control the variable resistor to change to a second resistance value in the second on-off state.

Preferably, the second resistance value may be within a range from about 50Ω to about 240Ω.

According to another aspect of the present invention, a method for detecting types of USB cable is provided, which makes use of the device for detecting types of USB cable described above to determine types of a USB cable. The USB cable at least includes a $V_{BUS}$ line and a ground line. An electronic device is connected to one end of the USB cable and provides a $V_{BUS}$ signal to the $V_{BUS}$ line. The method includes the following steps: connecting the detection circuit to another end of the USB cable opposing to the electronic device; electrically connecting to the detection circuit by a control unit; configuring the control unit to control the first switch, the second switch, the third switch and the fourth switch according to a plurality of on-off states; configuring the control unit to control the variable resistor and the signal source to transmit the detection signal respectively corresponding to the plurality of on-off states, configuring the control unit to receive the $V_{BUS}$ signal and the detection signal respectively from the receiving end in the plurality of on-off states to generate a plurality of detection results; and configuring the control unit to determine types of the USB cable based on the plurality of detection results.

Preferably, the plurality of on-off states may include a first on-off state, a second on-off state and a third on-off state, the second switch is switched on and the first, the third and the fourth switch are switched off in the first on-off state. In the second on-off state, the second and the third switch are switched on and the first and the fourth switch are switched off. In the third on-off state, the second, the third and the fourth switch are switched on and the first switch is switched off. Also, the control unit is configured to receive the $V_{BUS}$ signal and the detection signal respectively from the receiving end in the first, the second and the third on-off states in order to generate the plurality of detection results respectively.

Preferably, in the step of configuring the control unit to control the variable resistor and the signal source to transmit the detection signal respectively in the plurality of on-off states, the control unit may be further configured to control the variable resistor to change to a first resistance value in the first and the third on-off states.

Preferably, the first resistance value may be about 1 kΩ.

Preferably, in the step of configuring the control unit to control the variable resistor and the signal source to transmit the detection signal respectively in the plurality of on-off states, the control unit may be further configured to control the variable resistor to change to a second resistance value in the second on-off state.

Preferably, the second resistance value may be within the range from about 50Ω to about 240Ω.

In conclusion, according to the device and method for detecting types of USB cable of the present invention, the variable resistor in the detection circuit is allowed to change within a certain range of resistance value without affecting each detection result as a premise in each case of the presence of the parasitic capacitor by providing a circuit framework of variable resistor in the detection circuit. Thereby, the accuracy in the bit 2 detection stage can be further enhanced.

DETAILED DESCRIPTION OF THE PREFERRED EMBODIMENTS

In order to facilitate the understanding of the technical features, the contents and the advantages of the present invention, and the effectiveness thereof that can be achieved, the present invention will be illustrated in detail below through embodiments with reference to the accompanying drawings. On the other hand, the diagrams used herein are merely intended to be schematic and auxiliary to the specification, but are not necessary to be true scale and precise configuration after implementing the present invention. Thus, it should not be interpreted in accordance with the scale and the configuration of the accompanying drawings to limit the scope of the present invention on the practical implementation.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
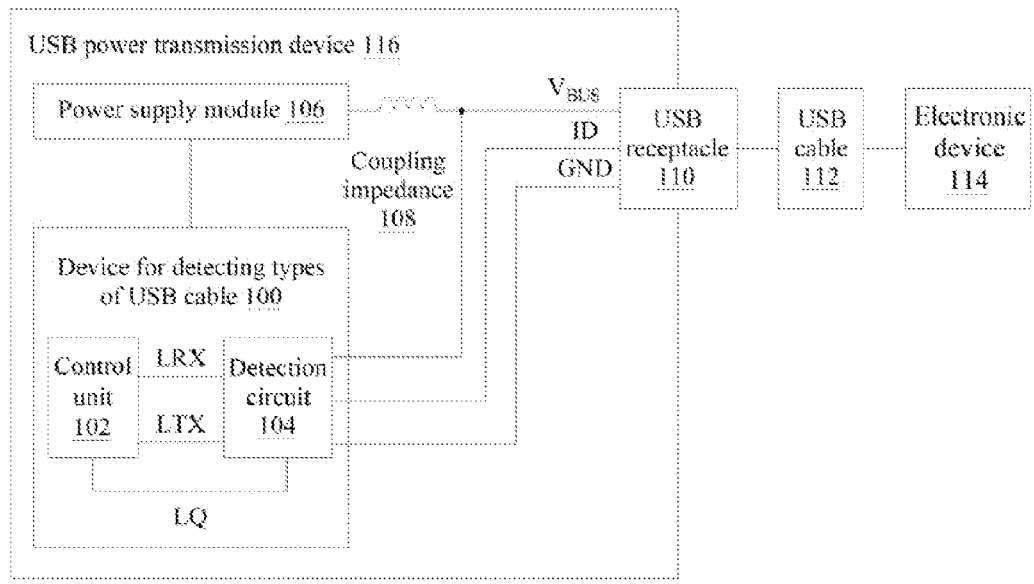
FIG. 1 is a block diagram according to the exemplary embodiment of the device for detecting types of USB cable of the present invention.

FIG. 1 is a block diagram according to the exemplary embodiment of the device for detecting types of USB cable of the present invention. Please refer to FIG. 1, the device for detecting types of USB cable 100 includes a control unit 102 and a detection circuit 104. The detection circuit 104 is electrically connected to the control unit 102. The control unit 102 may be a central processing unit (CPU), a microprocessor, a network processor (NP), a microcontroller, or a semiconductor integrated circuit (IC) with a specific function. Also, the control unit 102 is connected to the detection circuit 104 through a RX line LRX, a TX line LTX and a switch control line LQ, respectively.

Further, the device for detecting types of USB cable 100 is usually disposed in a USB power transmission device 116. The USB power transmission device 116 includes a power supply module 106 and a USB receptacle 110. In general, a source end (provider) and a receiving end (consumer) are defined in USB power delivery (USB PD) specification. Both sides must decide the actual transmitted voltage value and current value through the data communication. The process thereof includes determining whether the inserted cable connector plug supports USB PD specification. Here, the USB power transmission device 116 is set as the source end and the USB receptacle is connected to one end of the USB cable. The USB cable at least includes a $V_{BUS}$ line and a ground line. Another end of the USB cable is connected to an electronic device 114 as a receiving end and provides a $V_{BUS}$ signal to the $V_{BUS}$ line.

In the USB power transmission device 116, the power supply module 106 is electrically connected to the device for detecting types of USB cable 100 of the present invention, and is configured to supply power after the type of the USB cable 112 connected by the USB power transmission device 116 is determined in the device for detecting types of USB cable 100. Here, the power supply module 106 is a common power supply, which may include a plurality of switches used to switch to a power supply with a voltage corresponding to the different types of the USB cable 112 (i.e. different current and voltage capabilities) after the type of the USB cable 112 connected by the USB power transmission device 116 is determined. Since the source end and the receiving end can be interchanged in different cases in the current known USB PD specification (i.e. the source end can be changed to the receiving end), the power supply module 106 also includes a mechanism which switches the USB power transmission device 116 to the receiving end. However, it is not the main concept of the present invention. In order to avoid unnecessarily confusing the present invention, the detailed description thereof is omitted.

As shown in the figure, the USB receptacle includes a $V_{BUS}$ end, an ID end and a ground end GND. The power supply module 106 may be connected to the $V_{BUS}$ end of the USB receptacle through a coupling impedance 108 to perform the power transmission. Further, in the USB PD system, it is allowed for the $V_{BUS}$ voltage higher than vSafe5V, and the current may be larger than 1.5 A. In order to prevent high voltage and large current exceeds the capabilities of the USB cable 112 in connection with different types of USB cable 112, the device for detecting types of USB cable 100 of the present invention provides a corresponding detection circuit and method to determine the overcurrent capabilities of the USB cable 112. Preferably, compared to the conventional techniques, the device for detecting types of USB cable 100 of the present invention mainly further provides a framework and method in the detection circuit 104 and the process of detection method for determining the types of Type-A/B (except Standard-A connector) connector to prevent the detection circuit 104 from determining the types of cable mistakenly.

In general, different types of the USB cable 112 achieve the objective of marking through the resistors connected in series and different capacitors between the $V_{BUS}$ end and the ID end and between the ID end and the ground end GND. As Table 1 below, it shows electrical marks currently used for Type-A/B plugs.

TABLE 1

Electrical marks currently used for Type-A/B plugs

| Types of plugs | | $V_{BUS}$-ID | ID-GND |
|---|---|---|---|
| Micro-A | Low Power | cPlug (1) | rID (2) |
| | PD | Open | rID |
| | legacy | Open | Resistance < 10Ω |
| STD-B/ | PD(5A) | cPlug | Open |
| Micro-B | legacy | Open | >100 KΩ |
| | PD(3A) | Open | cPlug |

Where cPlug represents capacitance which ranges from about 5 nF to about 15 nF; rID is resistance which ranges from about 0.9Ω to 1.1 KΩ.

Figure 2:
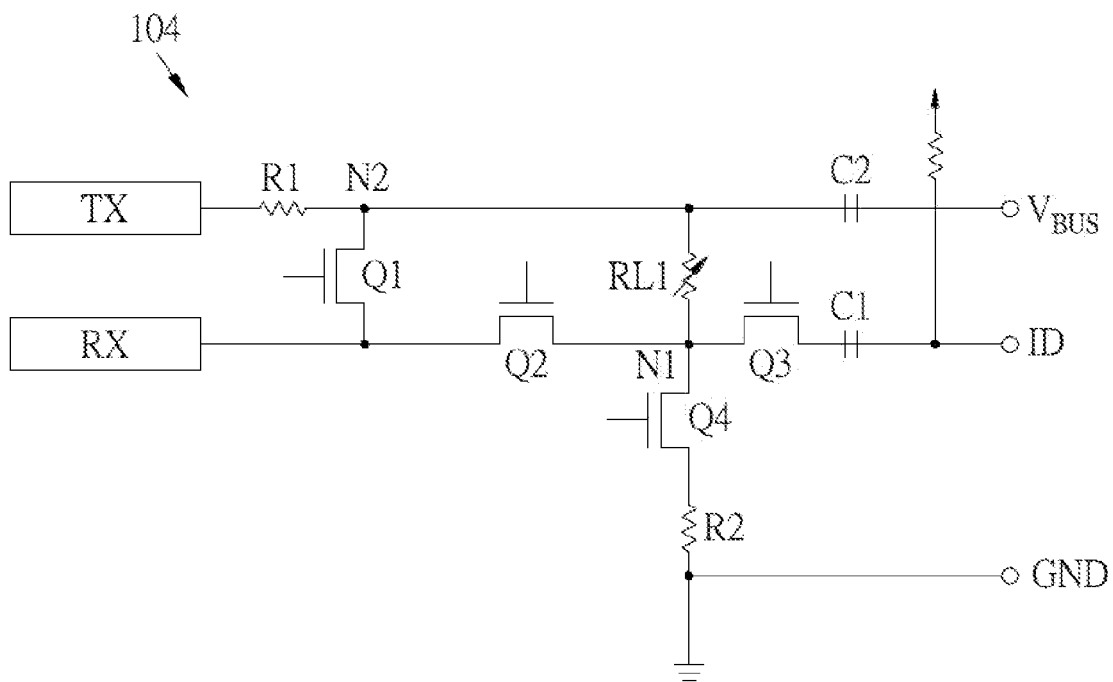
FIG. 2 is a circuit layout diagram of a detection circuit depicted according to the exemplary embodiment of the device for detecting types of USB cable of the present invention.

FIG. 2 is a circuit layout diagram of a detection circuit depicted according to the exemplary embodiment of the device for detecting types of USB cable of the present invention. The framework of the detection circuit 104 will now be illustrated based on the accompanying drawings. As shown in FIG. 2, the detection circuit 104 includes a signal source TX, a receiving end RX, a first resistor R1, a second resistor R2, a variable resistor RL1, a first capacitor C1, a second capacitor C2, a first switch Q1, a second switch Q2, a third switch Q3, a fourth switch Q4, a $V_{BUS}$ end, an ID end and a ground end GND. Here, the $V_{BUS}$ end, the ID end and the ground end GND of the detection circuit 104 correspond to the USB receptacle. The signal source TX provides a detection signal, and is controlled by a control unit 102 through a signal source line LTX. The first resistor R1 has a first end and a second end. The first end of the first resistor R1 is connected to the signal source TX. The variable resistor RL1 has a first end and a second end. The first end of the variable resistor RL1 is connected to the second end of the first resistors R1. The second resistor R2 has a first end and a second end. The first end of the second resistor R2 is connected to the second end of the variable resistor RL1, and the second end of the second resistor R2 is connected to the ground end GND corresponding to the USB receptacle. The first switch Q1, the second switch Q2, the third switch Q3, the fourth switch Q4 may be switching transistors known to those skills in the art and receives the control instructions from the control unit 102 through the switch control line LQ.

In addition, the first capacitor C1 of the detection circuit 104 has a first end and a second end. The first end of the first capacitor C1 is connected to a first node N1 between the variable resistor RL1 and the second resistor R2. The second end of the first capacitor C1 is connected to the ID end. The second capacitor C2 has a first end and a second end. The first end of the second capacitor C2 is connected to a second node N2 between the first resistor R1 and the second resistor R2. The second end of the second capacitor C2 is connected to the $V_{BUS}$ end. Here, the first capacitor C1 and the second capacitor C2 are served as filters, such that the electromagnetic interference transmitted therethrough may be reduced. The first resistor R1 is an output impedance rTX of the signal source TX. Preferably, the resistance value of the first resistor R1 may be about 62Ω. According to a preferred embodiment of the present invention, the second resistor R2 may be set as about 33Ω.

The first switch Q1 is connected between the second node N2 and the receiving end RX. One end of the second switch Q2 is connected between the receiving end RX and the first switch Q1, another end thereof is connected to the first node N1. The third switch Q3 is connected in series between the first node N1 and the first capacitor C1. The fourth switch Q4 is connected in series between the first node N1 and the first end of the second resistor R2. Here, the first switch Q1, the second switch Q2, the third switch Q3, the fourth switch Q4 and the variable resistor RL1 are controlled by the control unit 102 through the switch control lines LQ respectively. The control unit 102 is configured to control the first switch Q1, the second switch Q2, the third switch Q3 and the fourth switch Q4 according to a plurality of on-off states and to control the resistance value of the variable resistor RL1 respectively corresponding to the plurality of on-off states. The control unit 102 includes a pulse transmitter and a receiver. The pulse transmitter is applied to an end with the USB power transmission device to transmit the detection signal from the signal source TX, for example, a carrier signal is applied from the $V_{BUS}$ end of the detection circuit to the $V_{BUS}$ line of the USB cable, and the receiver is configured to receive the detection signal returned and the $V_{BUS}$ signal respectively from the receiving end RX during the plurality of on-off states. That is, the receiver of the control unit 102 detects if the signal exists, and generates a plurality of detection results accordingly. The types of the USB cable is then determined based on the plurality of detection results.

In detail, according to the preferred embodiment of the present invention, the plurality of on-off states includes a first on-off state, a second on-off state and a third on-off state, in which in the first on-off state, the second switch Q2 is switched on and the first, the third and the fourth switch Q1, Q3 and Q4 are switched off. In the second on-off state, the second and the third switch Q2 and Q3 are switched on and the first and the fourth switch Q1 and Q4 are switched off. In the third on-off state, the second, the third and the fourth switch Q2, Q3 and Q4 are switched on and the first switch Q1 is switched off. Also, the control unit 102 is configured to receive the $V_{BUS}$ signal and the detection signal respectively from the receiving end in the first, the second and the third on-off states in order to generate the plurality of detection results respectively. The process of detection applied to the current USB detection circuit is as follows. Firstly, the resistance value of the variable resistor RL1 is assumed to be constant. Preferably, the variable resistor RL1 is assumed to be fixed at 1 KΩ:

1) The first, the third and the fourth switch Q1, Q3 and Q4 are switched off.

2) The second switch Q2 is switched on (the detection circuit 104 is in the first on/off state).

3) A carrier signal (sinusoidal wave) is transmitted from the signal source TX, the receiving end RX detects the signal→a returned result of bit 1 is 1, otherwise the returned result of bit 1 is 0.

4) The third switch Q3 is switched on (the detection circuit 104 is in the second on/off state).

5) A carrier signal (sinusoidal wave) is transmitted from the signal source TX, the receiving end RX detects the signal→a returned result of bit 2 is 1, otherwise the returned result of bit 2 is 0.

6) The fourth switch Q4 is switched on (the detection circuit 104 is in the third on/off state).

7) A carrier signal (sinusoidal wave) is transmitted from the signal source TX the receiving end RX detects the signal→a returned result of bit 3 is 1, otherwise the returned result of bit 3 is 0.

The table 2 below is the specification of detection for different types of plugs:

TABLE 2

| bit1 | bit2 | bit3 | Micro-A plug | Micro-B or STD-B plug | Approximation level at receiving end RX on bit 1 stage | Approximation level at receiving end RX on bit 2 stage | Approximation level at receiving end RX on bit 3 stage |
|---|---|---|---|---|---|---|---|
| 1 | 1 | 1 | Low power | PD(5A) | ~0 dB | ~0 dB | ~-9 dB |
| 1 | 1 | 0 | PD | Legacy | ~0 dB | ~-6 dB(PD) ~0 dB(Legacy) | ~-30 dB |
| 1 | 0 | 1 | Fault | Fault | | | |
| 1 | 0 | 0 | Fault | PD(3A) | ~0 dB | ~-40 dB | ~-40 dB |
| 0 | 1 | 1 | Fault | Fault | | | |
| 0 | 1 | 0 | Fault | Fault | | | |
| 0 | 0 | 1 | Fault | Fault | | | |
| 0 | 0 | 0 | Fault | Fault | | | |

Figure 3:
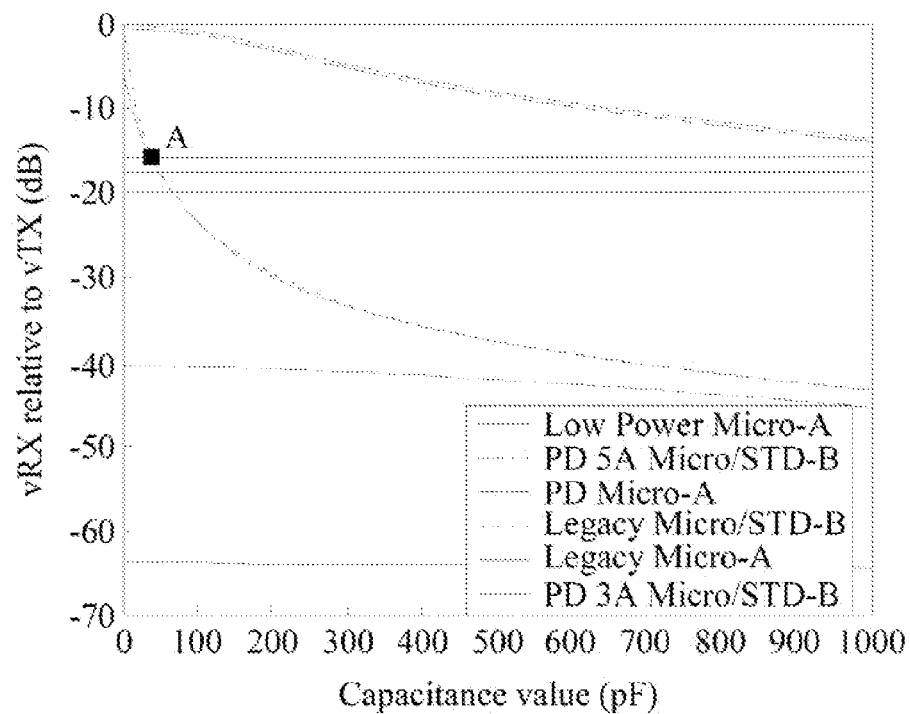
FIG. 3 is a relation curve diagram between the amplitude of the sinusoidal wave vRX at the RX end (dB, relative to the amplitude of the sinusoidal wave vTX) and the parasitic capacitor at the ID end with a fixed variable resistor in the bit2 detection stage.

Please refer to FIG. 3, which is a relation curve diagram between the amplitude of the sinusoidal wave vRX at the RX end (dB, relative to the amplitude of the sinusoidal wave vTX) and the parasitic capacitor at the ID end with a fixed variable resistor RL1 in the bit2 detection stage. Assuming that the end has a correct match (rTX), the amplitude of the sinusoidal wave vTX of the second node N2=150 mVRMS. The threshold value for determining whether the sinusoidal wave exists at the RX end vSqDet=20 mVRMS. i.e. the sinusoidal wave is defined as undetectable at the RX end when it is attenuated by above 17.50 dB relative to vTX. Further, the detection circuit 104 is taken as a sinusoidal steady state circuit for analysis. The relation curve diagram between the amplitude of the sinusoidal wave vRX at the RX end (dB, relative to the amplitude of the sinusoidal wave vTX) and the parasitic capacitor at the ID end in the bit2 detection stage is shown as FIG. 3. In general, owing to the influence of the input misalignment voltage of the detection circuit at the RX end and the external noise, the amplitude of the sinusoidal wave vRX detected at the RX end has to exceed the threshold value vSqDet+5 mV (−15.56 dB) in order to ensure that the sinusoidal wave can be detected at the RX end; the amplitude of the sinusoidal wave vRX detected at the RX end has to be smaller than the threshold value vSqDet−5 mV (−20 dB) in order to ensure that the signal is undetectable. Furthermore, according to the Table 2 above, the returned result of bit 2 has to be "1", i.e. the attenuation of signal has to be greater than −15.56 dB in the bit 2 detection stage for PD Micro-A plug and Legacy Micro/STD-B plug.

According to the position of point A, when the parasitic capacitance at the ID end reaches about 38 pF as shown in FIG. 3, the returned result of detection while connecting to PD Micro-A plug and Legacy Micro/STD-B plug cannot be ensured to be "1" and thus will result in determining the types of cable mistakenly by the control unit 102. i.e. misrecognized as Legacy Micro-A or PD (3 A) Micro/STD-B plug. Here, the optimization is performed in connection with the connection of PD Micro-A plug and Legacy Micro/STD-B plug. When the parasitic capacitance is less than 1 nF, the remaining four types of plugs are not much affected by the parasitic capacitor, the detection result will not be inconsistent with the Table 2 above. Thus, the description thereof is omitted. As one can know, if the variable resistor RL1 is set as a fixed resistance value of about 1 KΩ, the tolerance to the parasitic capacitance is considerably low in the bit 2 detection stage due to the output impedance of the TX end of 1 KΩ is relatively larger when the detection circuit 104 is in the second on-offstate. This leads to insufficient driving capability of the carrier signal provided at the TX end and a slight load can cause a great attenuation to the amplitude of the sinusoidal wave at the RX end.

Therefore, according to the inventive concept of the present invention, a variable resistor RL1 is disposed in the detection circuit 104, such that the resistance value of the 1 KΩ resistor can be reduced in the bit 2 detection stage to decrease the excessive attenuation of the sinusoidal wave provided at the TX end caused by the parasitic capacitor. At the same time, the detection result at the RX end can also be ensured to satisfy the column of bit 2 in the table above while connecting to Micro-A or PD (3 A) Micro/STD-B plug. And the sinusoidal wave will be undetectable at the RX end while connecting to Legacy Micro-A or PD (3 A) Micro/STD-B plug due to the extreme small resistance value of the variable resistors RL1.

According to the description above, an example of the process of detection is provided below according to the exemplary embodiment of the device for detecting types of USB cable of the present invention:

1) The first, the third and the fourth switch Q1, Q3 and Q4 are switched off.

2) The second switch Q2 is switched on (the detection circuit 104 is in the first on/off state).

3) The variable resistor RL1 is adjusted to the first resistance value.

4) A carrier signal (sinusoidal wave) is transmitted from the signal source TX, the receiving end RX detects the signal→a returned result of bit 1 is 1, otherwise the returned result of bit 1 is 0.

5) The third switch Q3 is switched on (the detection circuit 104 is in the second on/off state).

6) The variable resistor RL1 is adjusted to the second resistance value.

7) A carrier signal (sinusoidal wave) is transmitted from the signal source TX, the receiving end RX detects the signal→a returned result of bit 2 is 1, otherwise the returned result of bit 2 is 0.

8) The fourth switch Q4 is switched on (the detection circuit 104 is in the third on/off state).

9) The variable resistor RL1 is adjusted to the first resistance value.

10) A carrier signal (sinusoidal wave) is transmitted from the signal source TX, the receiving end RX detects the signal→a returned result of bit 3 is 1, otherwise the returned result of bit 3 is 0.

In the steps described above, the first resistance value is preferred to be 1 KΩ to ensure that the detection result can satisfy Table 2 in the bit 1 and bit 3 detection stages.

According to the device for detecting types of USB cable of the present invention the type of USB cable detection device of the present invention, the maximum parasitic capacitance at the ID end is set as 150 pF. It should be understood by the skills in the art that the parasitic capacitance value is changeable. The value used here is for example only. In the case of the presence of the parasitic capacitance described above, since the amplitude at the RX end has to be greater than −15.56 dB while connecting to Low Power Micro-A, PD (5 A) Micro/STD-B. PD Micro-A and Legacy Micro/STD-B, 150 pF capacitor is considered to be introduced between ID and GND for vRX only when the four types of plug connections are calculated in consideration of the extra increase to the attenuation caused by the parasitic capacitor at the ID end to ensure that the amplitude at the RX end is greater than −15.56 dB in the case of the maximum parasitic capacitor. The amplitude of the sinusoidal wave vRX at the RX end while connecting to Legacy Micro-A, PD (3 A) Micro/STD-B is calculated without considering 150 pF capacitor between the ID end and the ground end GND. Thereby the amplitude at the RX end can be ensured to be smaller than −20 dB without the attenuation caused by the parasitic capacitance.

Figure 4:
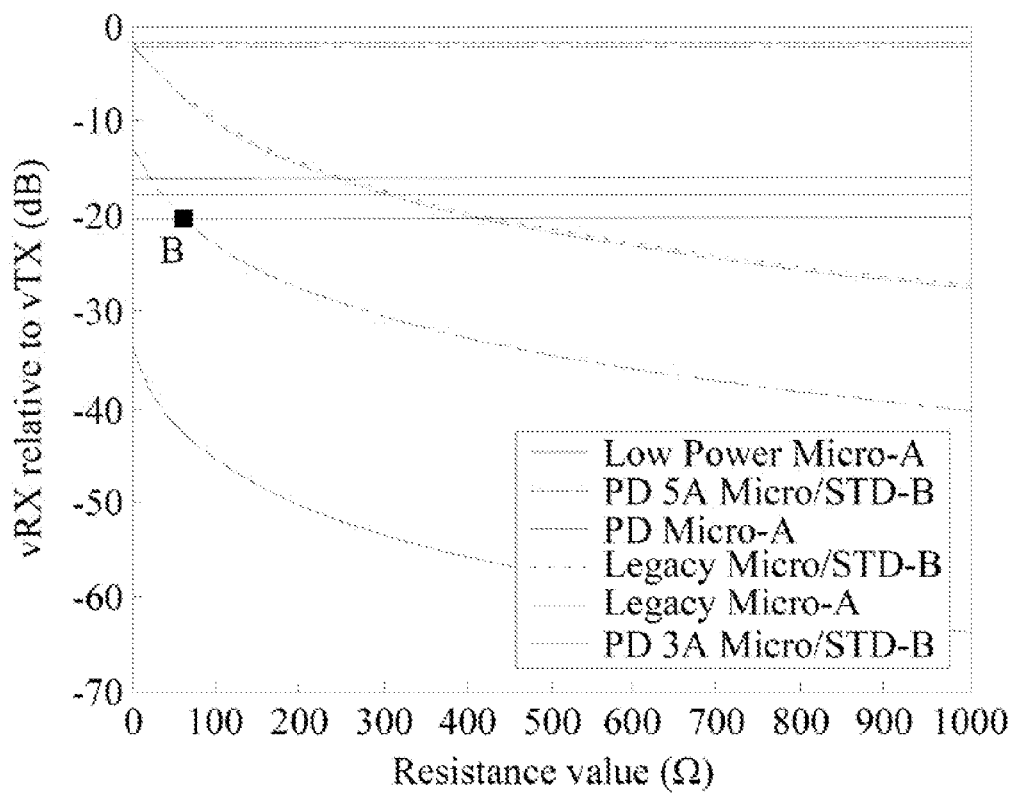
FIG. 4 is a relation curve diagram between the amplitude of the sinusoidal wave vRX at the RX end (dB, relative to the amplitude of the sinusoidal wave vTX) and the magnitude of the resistance value of the variable resistor RL1.

The relation between the amplitude of the sinusoidal wave vRX at the RX end (dB, relative to the amplitude of the sinusoidal wave vTX) calculated by summarizing the above conditions and the magnitude of the resistance value of the variable resistor RL1 is shown in FIG. 4. As one can know from FIG. 4, when the resistance value of the variable resistor RL1 is adjusted to within the range from about 50Ω to about 240Ω according to the position of point B in the bit 2 detection stage, the maximum 150 pF parasitic capacitance set at the ID end can be tolerated without causing error to the detection results of cable types. Thus, in the example of the process of detection described above, the second resistance value may be preferably within the range from about 50Ω to about 240Ω. Even better, the second resistance value is taken as 119Ω for maximum amplitude of tolerance.

Figure 5:
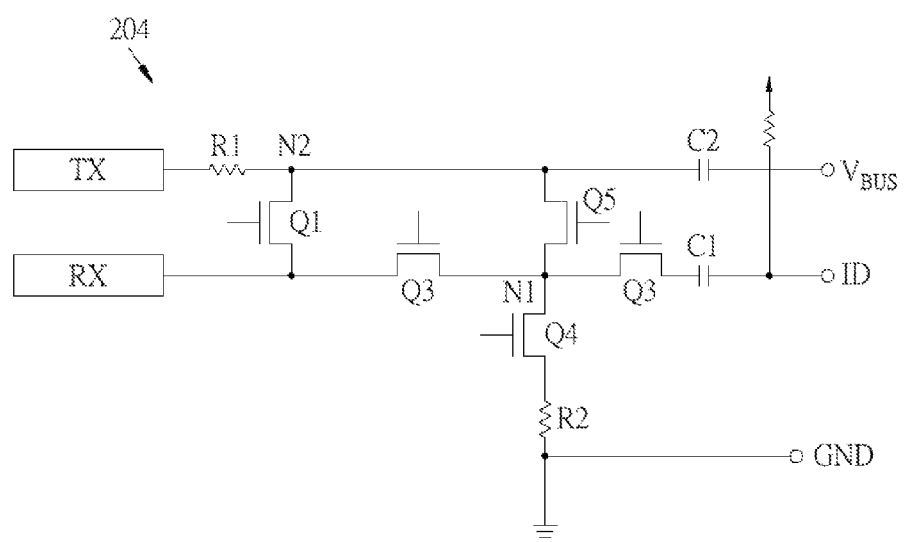
FIG. 5 is a circuit layout diagram of a detection circuit depicted according to another exemplary embodiment of the device for detecting types of USB cable of the present invention.

FIG. 5 is a circuit layout diagram of a detection circuit depicted according to another exemplary embodiment of the device for detecting types of USB cable of the present invention. The framework of the detection circuit 104 is shown in the figure. As shown in FIG. 2, the detection circuit 104 includes the signal source TX, the receiving end RX, the first resistor R1, the second resistor R2, the first capacitor C1, the second capacitor C2, the first switch Q1, the second switch Q2, the third switch Q3, the fourth switch Q4, the fifth switch Q5, the $V_{BUS}$ end, the ID end and the ground end GND. The numeral references of the elements is as the same as the same elements in FIG. 2 and thus the detailed description thereof is omitted. The difference from the exemplary embodiments described above is that the variable resistor RL1 is replaced by a fifth switch Q5. The fifth switch Q5 may be a metal oxide semiconductor field effect transistor (MOSFET), and a resistance Rds between a drain electrode and a source electrode is adjusted by controlling a gate voltage of the fifth switch Q5 in order to achieve the resistance change as done by the variable resistor RL1. In addition, the fifth switch Q5 may also be a complementary metal oxide semiconductor field effect transistor (CMOS) and also adjust the resistance value of the resistor Rds by controlling the gate voltage. It should be noted that the fifth switch Q5 carries out the control corresponding to the plurality of on-off states described above through the switch control line LQ by the control unit 102.

Figure 6:
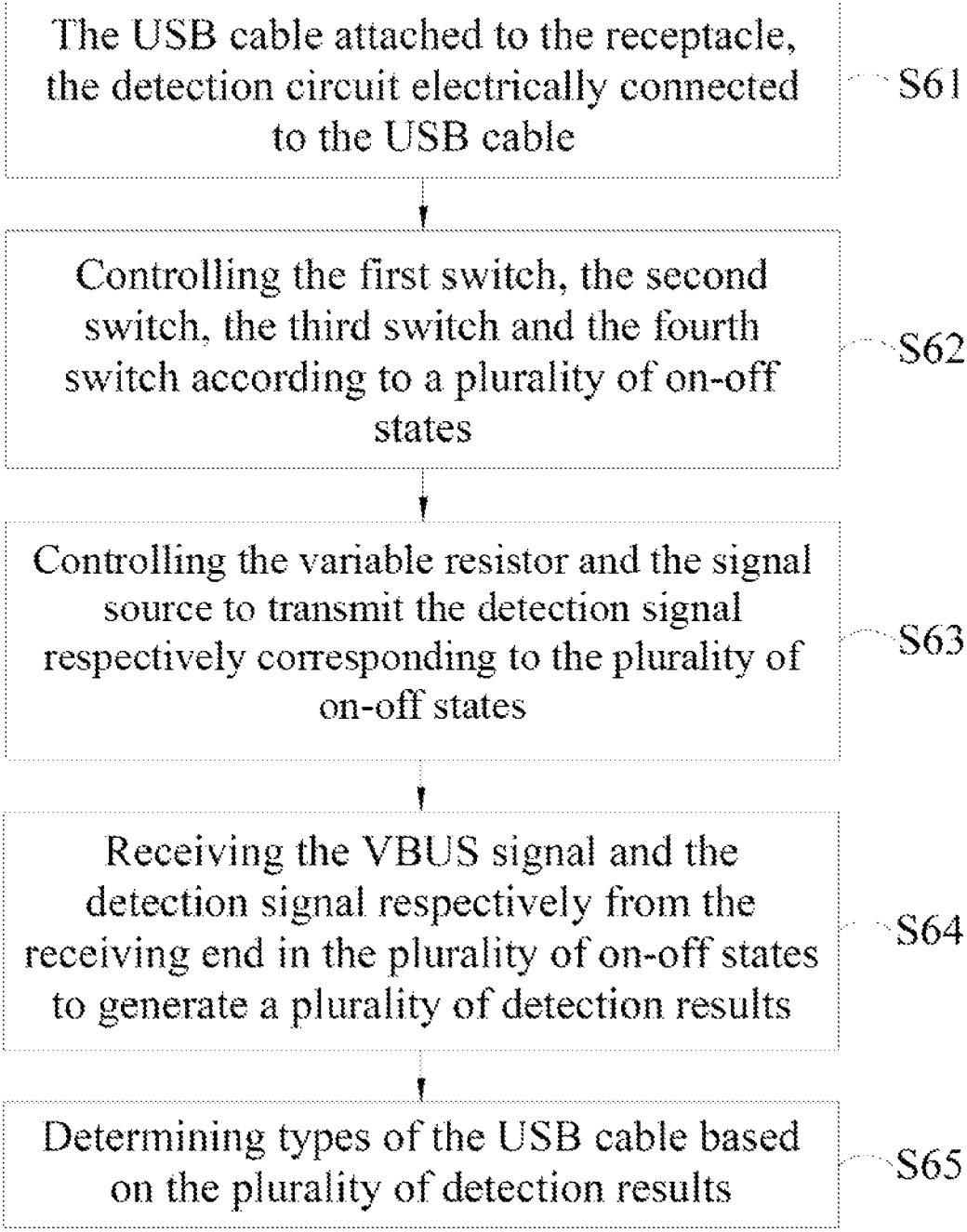
FIG. 6 is a flow chart depicted according to the first embodiment of the method for detecting types of USB cable of the present invention.

FIG. 6 is a flow chart of the first embodiment depicted according to the method for detecting types of USB cable of the present invention. Please refer to FIG. 6, the present invention also provides a method for detecting types of USB cable, which makes use of the device for detecting types of USB cable 100 described above to determine types of a USB cable at the end of the USB power transmission device 116. The USB cable at least includes a $V_{BUS}$ line and a ground line. As described above, an electronic device is connected to one end of the USB cable and provides a $V_{BUS}$ signal to the $V_{BUS}$ line. The method for detecting types of USB cable includes the following steps:

First, the USB cable is attached to the receptacle. The detection circuit is electrically connected to the USB cable (step S61), Then, the control unit is configured to control the first switch, the second switch, the third switch and the fourth switch according to a plurality of on-off states (step S62), in which the plurality of on-off states are same as those of the embodiments described above and includes the first on-off state, the second on-off state and the third on-off state. The control unit 102 controls the first to fourth switch Q1 to Q4 in the detection circuit through the switch control line.

After that, the control unit 102 is configured to control the variable resistor and the signal source to transmit the detection signal respectively corresponding to the plurality of on-off states (step S63). As described above, the control unit 102 includes a pulse transmitter and a receiver. The pulse transmitter is for transmitting the detection signal from the signal source TX at an end of the USB power transmission device. The receiver is configured to receive the detection signal returned and the $V_{BUS}$ signal respectively from the receiving end RX during the plurality of on-off states. Next, the control unit is configured to receive the $V_{BUS}$ signal and the detection signal respectively from the receiving end RX in the plurality of on-off states to generate a plurality of detection results (step S64). Finally, the control unit 102 is configured to determine types of the USB cable based on the plurality of detection results (step S65). Wherein, the method for detecting types of USB cable determines types of the USB cable in accordance with Table 2 above. Therefore, preferably, the resistance value of the variable resistor is adjusted to about 1 KΩ in the first and the third on-off states. The resistance value of the variable resistor is adjusted within the range from about 50Ω to about 240Ω in the second on-off state to ensure that the specifications of Table 2 can still be satisfied in the bit 1 and bit3 detection stages and the mistaken determination can also be reduced during the connection to Legacy Micro-A or PD (3 A) Micro/STD-B plug in the bit2 detection stage.

Figure 7:
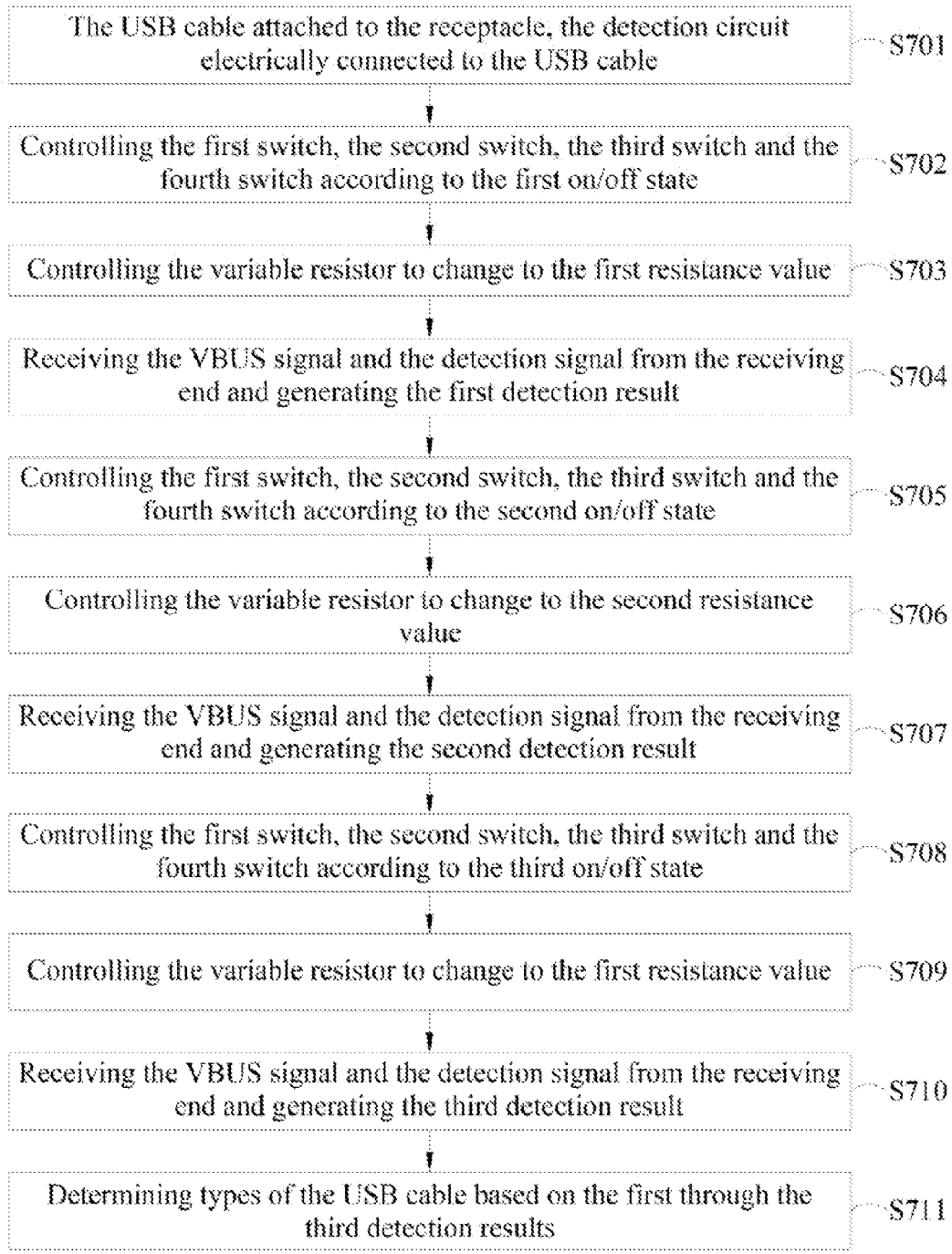
FIG. 7 is a flow chart depicted according to the second embodiment of the method for detecting types of USB cable of the present invention.

Please refer to FIG. 7, which is a flow chart depicted according to the second embodiment of the method for detecting types of USB cable of the present invention. The method includes the following steps:

First, the USB cable is attached to the receptacle. The detection circuit is electrically connected to the USB cable (step S701). The control unit 102 is configured to control the first switch, the second switch, the third switch and the fourth switch according to the first on/off state (step S702). Here and hereinafter, the first on-off state, the second on-off state and the third on-off state correspond to those described above and thus the detailed description thereof is omitted. The control unit 102 is configured to control the variable resistor to change to the first resistance value (step S703). Preferably, the first resistance value is about 1 KΩ. The $V_{BUS}$ signal and the detection signal are then received from the receiving end and the first detection result is generated (step S704). This first detection result corresponds to the result "1" or "0" in the bit 1 detection stage. The conditions thereof are same as those described above. The control unit 102 is configured to control the first switch, the second switch, the third switch and the fourth switch according to the second on/off state (step S705). The variable resistor is controlled to change to the second resistance value (step S706). Preferably, a second resistance value is within the range from about 50Ω to about 240Ω.

Next, the $V_{BUS}$ signal and the detection signal are received from the receiving end and the second detection result is generated (step S707). This second detection result corresponds to the result "1" or "0" in the bit 2 detection stage described above. The conditions thereof are also same as those described above. The control unit 102 is again configured to control the first switch, the second switch, the third switch and the fourth switch according to the third on/off state (step S708). The variable resistor is controlled to change to the first resistance value (step S709). The control unit 102 is configured to receive the $V_{BUS}$ signal and the detection signal from the receiving end and the third detection result is generated (step S710). Finally, types of the USB cable are determined based on the first through the third detection results (step S711). Wherein, the method of the present embodiment can still satisfy Table 2 in the bit 1 and bit 3 detection stages and the mistaken determination can also be reduced during the connection to Legacy Micro-A or PD (3 A) Micro/STD-B plug in the bit2 detection stage.

In conclusion, the device and method for detecting types of USB cable of the present invention reduces the mistaken determination to the types of the USB cable in each case of the presence of the parasitic capacitor by providing a circuit framework of variable resistor in the detection circuit. In addition, the present invention also provides the results of embodiments to prove that the device and method for detecting types of USB cable of the present invention actually can further enhance the accuracy in the bit 2 detection stage by allowing the variable resistor in the detection circuit to change within a certain range of resistance value in the presence of the parasitic capacitor without affecting bit 1 and bit 3 detection results as a premise.

The above description is only illustrative, but is not restrictive. Any disclosures without departing from the spirit and scope of the present invention and its equivalent modifications or changes, should be enclosed within the scope of the appended claims.

What is claimed is:

1. A device for detecting types of universal serial bus (USB) cable, applicable to determine types of a USB cable, the USB cable at least comprising a $V_{BUS}$ line and a ground line, an electronic device connected to another end of the USB cable opposing to the device for detecting types of USB cable, and providing a $V_{BUS}$ signal to the $V_{BUS}$ line, the device for detecting types of USB cable comprising:
   a detection circuit, comprising:
   a signal source, providing a detection signal;
   a first resistor, having a first end and a second end, the first end connected to the signal source;
   a variable resistor, having a first end and a second end, the first end of the variable resistor connected to the second end of the first resistors;
   a second resistor, having a first end and a second end, the first end of the second resistor connected to the second end of the variable resistor, the second end of the second resistor connected to a ground end corresponding to the ground line;
   a first capacitor, having a first end and a second end, the first end of the first capacitor connected to a first node between the variable resistor and the second resistor, the second end of the first capacitor connected to an ID end;
   a second capacitor, having a first end and a second end, the first end of the second capacitor connected to a second node between the first resistor and the second resistor, the second end of the second capacitor connected to a $V_{BUS}$ end corresponding to the $V_{BUS}$ line;
   a receiving end;
   a first switch, connected between the second node and the receiving end;
   a second switch, one end of which connected between the receiving end and the second end of the first switch, another end connected to the first node;
   a third switch, connected in series between the first node and the first capacitor; and
   a fourth switch, connected in series between the first node and the first end of the second resistor; and
   a control unit, electrically connected to the detection circuit, configured to control the first switch, the second switch, the third switch and the fourth switch according to a plurality of on-off states, to control the variable resistor and the signal source to transmit the detection signal respectively corresponding to the plurality of on-off states, to receive the detection signal and the $V_{BUS}$ signal respectively from the receiving end during the plurality of on-off states, to generate a plurality of detection results and to determine types of the USB cable based on the plurality of detection results.

2. The device for detecting types of USB cable of claim 1, wherein the plurality of on-off states comprise a first on-off state, a second on-off state and a third on-off state, wherein the second switch is switched on, and the first, the third and the fourth switch are switched off in the first on-off state, the second and the third switch are switched on, and the first and the fourth switch are switched off in the second on-off state, the second, the third and the fourth switch are switched on, and the first switch is switched off in the third on-off state, and the control unit is configured to receive the $V_{BUS}$ signal and the detection signal respectively from the receiving end in the first, the second and the third on-off states in order to generate the plurality of detection results respectively.

3. The device for detecting types of USB cable of claim 2, wherein the control unit is configured to control the variable resistor to change to a first resistance value in the first and the third on-off states.

4. The device for detecting types of USB cable of claim 3, wherein the first resistance value is about 1 kΩ.

5. The device for detecting types of USB cable of claim 2, wherein the control unit is configured to control the variable resistor to change to a second resistance value in the second on-off state.

6. The device for detecting types of USB cable of claim 5, wherein the second resistance value is within a range from about 50Ω to about 240Ω.

7. A method for detecting types of USB cable, the USB cable at least comprising a $V_{BUS}$ line and a ground line, an electronic device connected to one end of the USB cable, and providing a $V_{BUS}$ signal to the $V_{BUS}$ line, the method comprising the following steps:
   connecting a detection circuit to another end of the USB cable opposing to the electronic device, wherein the detection circuit comprises:
   a signal source, providing a detection signal;
   a first resistor, having a first end and a second end, the first end connected to the signal source;
   a variable resistor, having a first end and a second end, the first end of the variable resistor connected to the second end of the first resistors;
   a second resistor, having a first end and a second end, the first end of the second resistor connected to the second end of the variable resistor, the second end of the second resistor connected to a ground end corresponding to the ground line;
   a first capacitor, having a first end and a second end, the first end of the first capacitor connected to a first node between the variable resistor and the second resistor, the second end of the first capacitor connected to an ID end;
   a second capacitor, having a first end and a second end, the first end of the second capacitor connected to a second node between the first resistor and the second resistor, the second end of the second capacitor connected to a VBUS end corresponding to the VBUS line;
   a receiving end;
   a first switch, connected between the second node and the receiving end;
   a second switch, one end of which connected between the receiving end and the second end of the first switch, another end connected to the first node;
   a third switch, connected in series between the first node and the first capacitor; and
   a fourth switch, connected in series between the first node and the first end of the second resistor;
   electrically connecting a control unit to the detection circuit;
   configuring the control unit to control the first switch, the second switch, the third switch and the fourth switch according to a plurality of on-off states;
   configuring the control unit to control the variable resistor and the signal source to transmit the detection signal respectively corresponding to the plurality of on-off states;
   configuring the control unit to receive the $V_{BUS}$ signal and the detection signal respectively from the receiving end in the plurality of on-off states, and to generate a plurality of detection results; and
   configuring the control unit to determine types of the USB cable based on the plurality of detection results.

8. The method for detecting types of USB cable of claim 7, wherein the plurality of on-off states comprise a first on-off state, a second on-off state and a third on-off state, wherein the second switch is switched on, and the first, the third and the fourth switch are switched off in the first on-off state, the second and the third switch are switched on, and the first and the fourth switch are switched off in the second on-off state, the second, the third and the fourth switch are switched on, and the first switch is switched off in the third on-off state, and the control unit is configured to receive the $V_{BUS}$ signal and the detection signal respectively from the receiving end in the first, the second and the third on-off states in order to generate the plurality of detection results respectively.

9. The method for detecting types of USB cable of claim 8, wherein in the step of configuring the control unit to control the variable resistor and the signal source to transmit the detection signal respectively in the plurality of on-off states, the control unit is further configured to control the variable resistor to change to a first resistance value in the first and the third on-off states.

10. The method for detecting types of USB cable of claim 9, wherein the first resistance value is about 1 kΩ.

11. The method for detecting types of USB cable of claim 8, wherein in the step of configuring the control unit to control the variable resistor and the signal source to transmit the detection signal respectively in the plurality of on-off states, the control unit is further configured to control the variable resistor to change to a second resistance value in the second on-off state.

12. The method for detecting types of USB cable of claim 11, wherein the second resistance value is within the range from about 50Ω to about 240Ω.

* * * * *